(12) United States Patent
Heyn

(10) Patent No.: US 7,482,773 B2
(45) Date of Patent: Jan. 27, 2009

(54) CLOSING AND OPENING SYSTEM OF A VEHICLE AND METHOD OF ADDRESSING A DRIVE OF SUCH A CLOSING AND OPENING SYSTEM

(75) Inventor: Detlef Heyn, Kirchhain (DE)

(73) Assignee: ArvinMeritor GmbH, Dietzenbach (DE)

( * ) Notice: Subject to any disclaimer, the term of this patent is extended or adjusted under 35 U.S.C. 154(b) by 121 days.

(21) Appl. No.: 11/701,263

(22) Filed: Feb. 1, 2007

(65) Prior Publication Data

US 2007/0194732 A1 Aug. 23, 2007

(30) Foreign Application Priority Data

Feb. 23, 2006 (EP) .................. 06003690

(51) Int. Cl.
*H02P 1/04* (2006.01)
(52) U.S. Cl. .................. 318/443; 318/280; 318/466; 318/283
(58) Field of Classification Search .................. 318/443, 318/466, 445, 468, 280, 283, 461; 49/26, 49/28
See application file for complete search history.

(56) References Cited

U.S. PATENT DOCUMENTS

| 4,736,144 | A | * | 4/1988 | Chun-Pu ...................... 318/467 |
| 5,521,474 | A | * | 5/1996 | Hahn ......................... 318/285 |
| 6,008,607 | A | | 12/1999 | Haderer et al. |
| 6,219,599 | B1 | | 4/2001 | Lamm et al. |
| 6,472,836 | B1 | | 10/2002 | Uebelein et al. |

FOREIGN PATENT DOCUMENTS

| DE | 40 20 351 | 1/1992 |
| DE | 196 15 127 | 4/1997 |

* cited by examiner

*Primary Examiner*—Rina I Duda
(74) *Attorney, Agent, or Firm*—Carlson, Gaskey & Olds

(57) ABSTRACT

A closing and opening system of a vehicle comprises a control device of an anti-pinch protection arrangement, where the control device is coupled with a drive of the closing and opening system. The control device has an input for at least one signal based on a variable, vehicle-sensitive data value. The control device is configured such that the control device determines a situation-specific anti-pinch protection parameter depending on the signal and addresses the drive in a situation-specific manner on the basis of the situation-specific anti-pinch protection parameter.

8 Claims, 3 Drawing Sheets

CLOSING AND OPENING SYSTEM OF A VEHICLE AND METHOD OF ADDRESSING A DRIVE OF SUCH A CLOSING AND OPENING SYSTEM

RELATED APPLICATIONS

The application claims priority to European Patent Application 06 003 690.2, which was filed Feb. 23, 2006.

BACKGROUND OF THE INVENTION

The invention relates to a closing and opening system of a vehicle. The invention further relates to a method of addressing a drive of at least one vehicular closing and opening system of this type, comprising a control device of an anti-pinch protection arrangement coupled with the drive.

The term "closing and opening system" is to be understood as a system which is able to close or open a component of a vehicle, more specifically to close and open a vehicle interior space. Examples are window lifter systems, sliding roof systems, collapsible roofs, roller blind systems, adjustable tailgates, etc. For the sake of clarity, the problem underlying the invention and the invention will be explained as follows using the example of a sliding roof system.

With known sliding roof systems, a cover can fully or partially expose a roof opening because the cover is movably mounted on a guide rail system. Moreover, the cover can assume a venting position by raising the cover at a rear end.

Modern sliding roof systems have an integrated anti-pinch protection function. To provide anti-pinch protection, the power of a drive is measured during movement of the cover, for instance. As soon as a given power is exceeded, a control device of the sliding roof system interprets that the cover has contacted an obstacle, and the drive of the cover is halted. Thus, the control device assumes that the resistance set against the drive is attributable to an obstacle.

Such an enhanced resistance, however, can also be attributed to higher vehicle speeds and closed side windows, as a pressure prevailing in the vehicle interior space depends on a number of closed/opened side windows, a degree of opening of any of the opened side windows, and a vehicle speed. When the cover is closed at higher vehicle speeds with closed side windows, the drive mechanism has to be operated with more power. When a given power of the drive mechanism is exceeded, the control device may wrongfully interpret that the cover has hit upon an obstacle, and stop driving the cover, even though the enhanced resistance against movement is a result of altered vehicle interior pressure.

At a low vehicle speed and with opened side windows, however, only a small amount of power is necessary for moving the cover, so that an obstacle has to set a comparatively high resistance against the cover. This stops the drive comparatively late.

From DE 196 15 127 C1 it is known to use an air pressure signal, generated by an air pressure sensor, for the consideration of varying pressure conditions. Depending on this air pressure signal, a limit value of the closing force limitation of a sliding roof will be corrected. The requirement of an air pressure sensor to determine the air pressure in the vehicle interior space is disadvantageous due to the additional costs incurred.

It is the object of the invention to provide a method of addressing a drive of at least one closing and opening system of a vehicle, in which an anti-pinch protection arrangement responds reliably, and is more cost effective.

SUMMARY OF THE INVENTION

In order to solve this problem, the invention makes provision for a method of addressing a drive of at least one closing and opening system of a vehicle. The method includes the following steps: feeding at least one signal to a control device, which signal is specific for a vehicle-sensitive, variable data value; determining a situation-specific anti-pinch protection parameter depending on the at least one signal; and operating an anti-pinch protection arrangement with the anti-pinch protection parameter.

The invention is based on a fundamental idea to introduce a vehicle-sensitive, variable data value via a signal in the control device of a component moved by the drive, and to operate the anti-pinch protection arrangement with different anti-pinch protection parameters. The operation of the anti-pinch protection arrangement will be altered depending on the respective vehicle-sensitive, variable data value which has been determined. A "vehicle-sensitive, variable data value" is to be understood here as a value that gives information about an instantaneous condition of the vehicle and not of the vehicle's environment or interior space. Depending on the signal, an anti-pinch protection parameter is determined with which the control device operates the anti-pinch protection arrangement. Thus, the anti-pinch protection arrangement is operated with different anti-pinch protection parameters, so that for example, at a higher vehicle speed where a drive exceeds a given power during shifting, the control device does not wrongfully assume there is an obstacle in the path of the component to be shifted (for instance of a cover of a sliding roof system or a side window), and needlessly stops the drive. The anti-pinch protection parameters will be empirically determined, for instance, for each vehicle model and any possible operating situation (vehicle speed, opening condition of a window, etc.) and stored in the control device. The control device is capable of adapting the operation of the anti-pinch protection arrangement to the various operating situations without an additional sensor.

A vehicle-sensitive, variable data value may incorporate the vehicle speed. The higher the vehicle speed, the more power has to be provided by the drive during shifting. If the closing and opening system is a sliding roof system, the drive has to provide more power during closing of a roof opening because a higher wind load acts on the cover, thus a larger resistance is opposed to the drive.

In addition or alternatively, the vehicle-sensitive, variable data value incorporates, for instance, an opening condition of the closing and opening system. If the closing and opening system is a sliding roof system, the drive of a cover has to provide more power with closed side windows than with opened side windows, because air pressure in the vehicle interior space is higher.

A similar influence as the opening condition of the closing and opening system, is the operating state position of a fan (ventilator) of an interior space venting system, which may be a vehicle-sensitive, variable data value. With a high ventilation power, the drive of the closing and opening system, due to a pressure equalization from the interior space towards the vehicle exterior has to provide a lower power than with the fan or ventilator being switched-off.

The invention further relates to a closing and opening system of a vehicle comprising a control device of an anti-pinch protection arrangement, where the control device is coupled with a drive of the closing and opening system and has an input for at least one signal based on variable, vehicle-specific data value. The control device is configured such that the control device determines a situation-specific anti-pinch protection parameter depending on the signal, and addresses the drive in a situation-specific manner on the basis of this parameter. In regard of the advantages, reference is made to the above explanations.

For obtaining the data value the control device is preferably coupled with an electric vehicle control unit. A vehicle control unit of this kind is already provided in vehicles and consequently only has to be run with an extended software.

These and other features of the present invention can be best understood from the following specification and drawings, the following of which is a brief description.

DETAILED DESCRIPTION OF THE PREFERRED EMBODIMENT

Basically, the invention may be applied to all closing and opening systems for vehicles, such as window lifter systems, sliding roof systems, collapsible roofs, roller blind systems, adjustable tailgates, etc. For better comprehension, the invention will be explained as follows using an example of a sliding roof system. It will be appreciated that the principles may be used in the same way with the other systems which have been mentioned, in particular with side windows.

Figure 1:
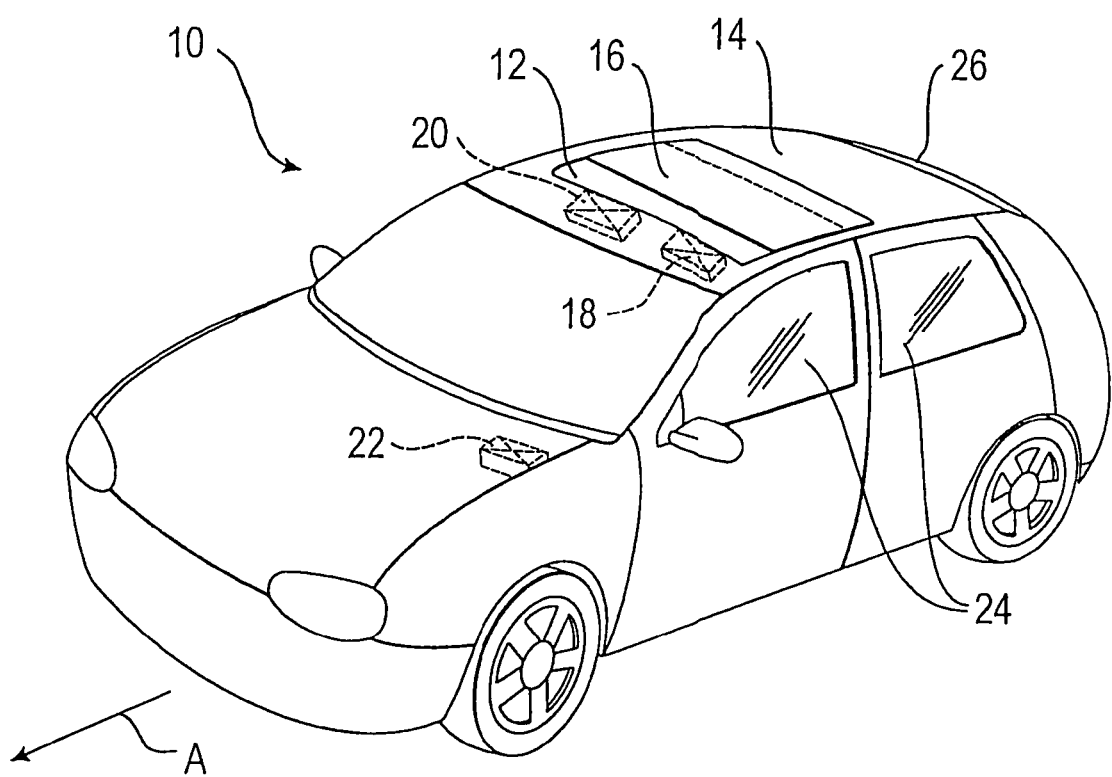
FIG. 1 shows a schematic perspective view of a vehicle with a closing and opening system according to the invention.

FIG. 1 shows a vehicle 10 including a sliding roof system. The sliding roof system has a roof opening 12 in an immovable roof part 14. The roof opening 12 may be exposed by a cover 16 which is movable in a longitudinal direction A of the vehicle 10, by the cover 16 being transferred in a known manner by a drive 18 (schematically shown) from a closed position to an open position and back again. In this process, the cover 16 can be moved to lie above an outer skin of the immovable roof part 14 or also to lie underneath the outer skin. As an alternative to having one single cover 16 it is also possible to have several covers (not shown).

The drive 18 is coupled with a control device 20 (schematically shown) of an anti-pinch protection arrangement through a bus system (not shown) as known. The control device 20 is, for instance, integrated in the immovable roof part 14 and configured such that the control device 20 has an input for a signal, which will be elaborated in the following.

Figure 2:
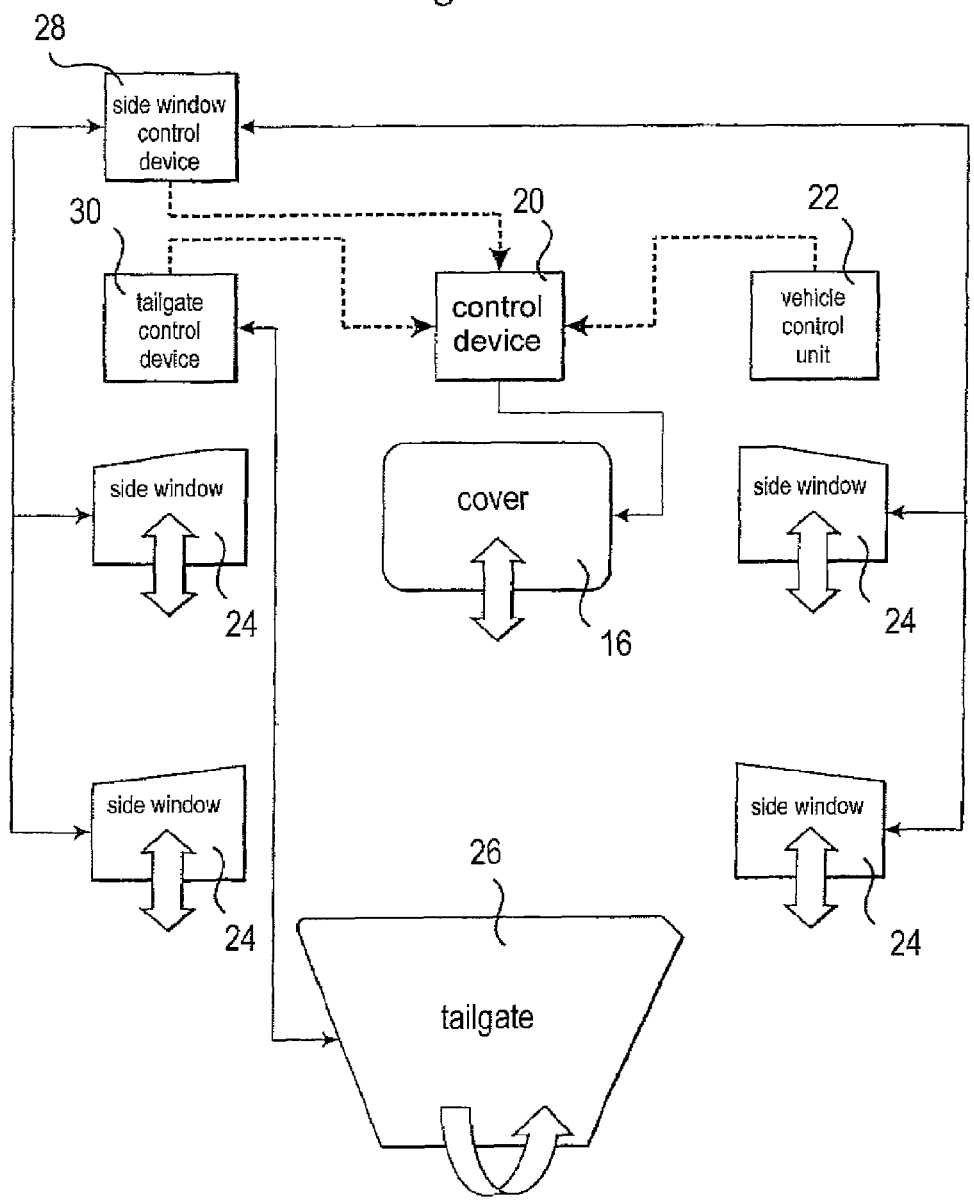
FIG. 2 is a logic block diagram of the closing and opening system according to the invention.

Arranged on a front portion of the vehicle 10 is an electric vehicle control unit 22 which is coupled with the control device 20 through a bus system (FIG. 2). A side window control device 28 and a tailgate control device 30, if any, are likewise coupled with the control device 20 through a bus system.

Figure 3:
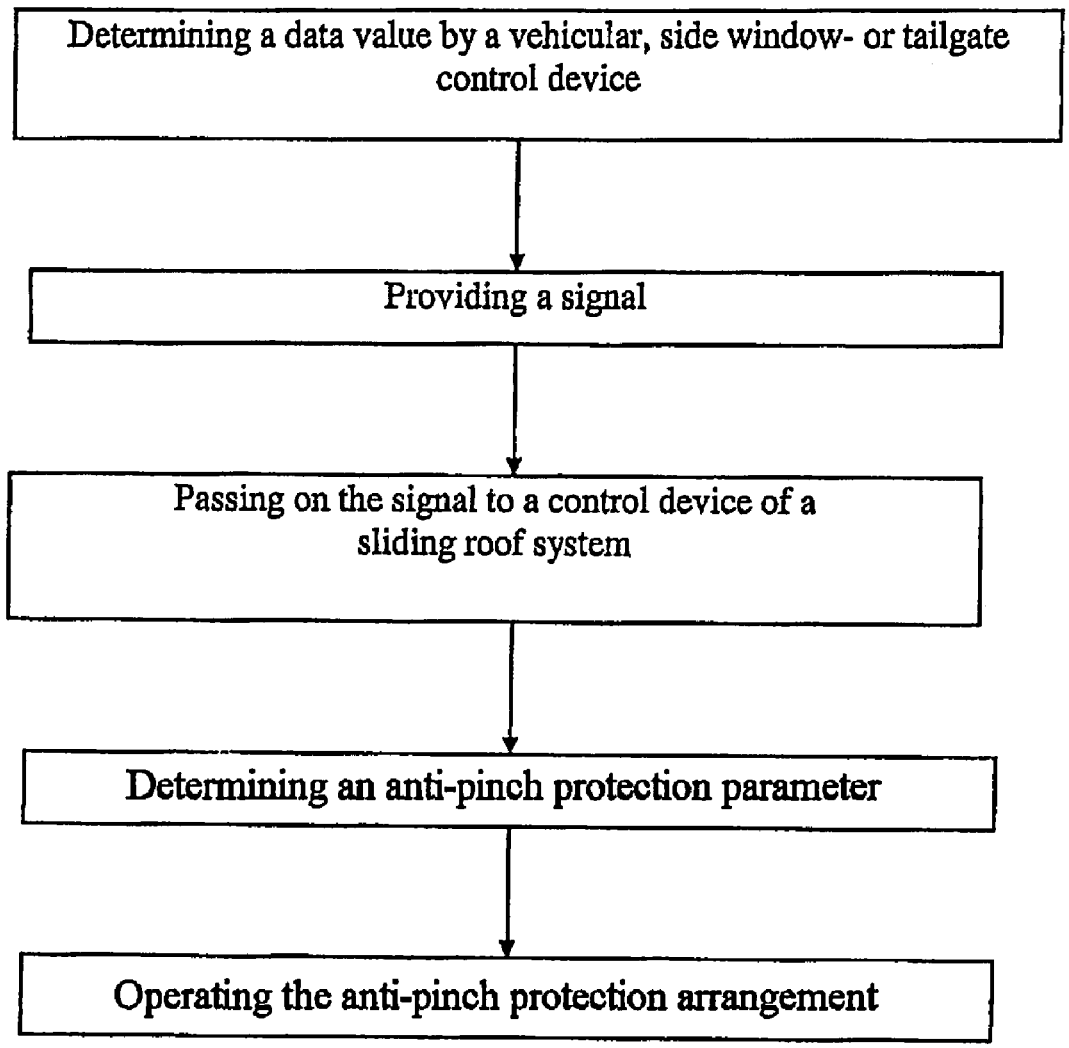
FIG. 3 shows a flow diagram of a method, according to the invention, of addressing a drive of the closing and opening system.

In the following, the method of addressing the drive 18 of the sliding roof system will be explained, which is illustrated in FIG. 3.

Vehicle-sensitive, variable data values such as vehicle speed or a ventilation position will be transformed in the vehicle control unit 22 to a signal. The specific signal is then passed on and fed to the control device 20. It is likewise possible to conduct a respective signal from the side window control device 28 and the tailgate control device 30 to the control device 20, which signals specifically incorporate an instantaneous opening condition of a side window 24 or a tailgate 26. In addition to the vehicle-sensitive, variable data values it is also possible that temperature, air humidity or a vehicle interior pressure have influence on the signal which has been determined and passed on to the control device 20.

A situation-specific anti-pinch protection parameter is determined depending on the signal, and an anti-pinch protection arrangement of the sliding roof system is operated with an adapted anti-pinch protection parameter, so that a higher vehicle speed and closed/opened side windows 24 will be taken into account during shifting of the cover 16. The anti-pinch protection parameters have been empirically ascertained for the present model of the vehicle and any possible operating situation (vehicle speed, opening condition of the side windows, etc.) and stored in the control device 20.

Vehicle-sensitive, variable data values and, thus, pressure conditions existing in the vehicle interior space are taken into account during shifting of the cover 16, so that the anti-pinch protection arrangement is operated at a higher level of reliability. If the power of the drive 18 during shifting of the cover 16 has only increased due to a side window 24 being closed or the vehicle speed being increased, the drive 18 will not halt unnecessarily due to the control device 20 wrongfully assuming that there is an obstacle in the path of the cover 16. Also, the drive 18 of the sliding roof system will not halt at a comparatively late point in time because a smaller power of the drive 18 during shifting of the cover 16 is needed with opened side windows 24.

Just as well, the control device 20 could operate several closing and opening systems with the situation-specific anti-pinch protection parameter (not shown). It is also conceivable to couple a second adjustable cover to the control device, or to take into account the opening condition of the second cover during shifting of the first cover.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of addressing a drive of at least one cover of a sliding roof system of a vehicle including a control device of an anti-pinch protection arrangement coupled with the drive, comprising the following steps:
    (a) feeding at least one signal to the control device, where the at least one signal is specific for a vehicle-sensitive, variable data value, wherein the vehicle-sensitive, variable data value is vehicle speed;
    (b) determining a situation-specific anti-pinch protection parameter depending on the at least one signal;
    (c) operating the anti-pinch protection arrangement with the situation-specific anti-pinch protection parameter; and
    (d) feeding an additional vehicle-sensitive, variable data value into the control device, the additional vehicle-sensitive, variable data value being at least one of an opening condition of side windows of the vehicle and an operating state position of a fan of an interior space venting system.

2. The method according to claim 1, wherein the control device is part of a sliding roof system.

3. The method according to claim 1, wherein the control device is part of a window lifter system.

4. The method according to claim 1, wherein the control device controls a plurality of closing and opening systems.

5. The method according to claim 1, wherein the situation-specific anti-pinch protection parameters are empirically ascertained for a model of the vehicle and any possible operating situation, and are stored in the control device.

6. A closing and opening system of a vehicle, comprising:

a control device of an anti-pinch protection arrangement coupled with a drive of a cover of a sliding roof system, wherein the control device has an input for at least one signal based on a variable, vehicle-specific data value, wherein the variable, vehicle-specific data value is vehicle speed, and with the control device being configured such that the control device determines a situation-specific anti-pinch protection parameter depending on the at least one signal and addresses the drive in a situation-specific manner on the basis of the situation-specific anti-pinch protection parameter, the control device being the control device of a window lifter, and wherein the control device receives an additional variable, vehicle specific data value that is at least one of an opening condition of side windows of the vehicle and an operating state position of a fan of an interior space venting system.

7. The closing and opening system according to claim 6, wherein the control device is coupled with an electric vehicle control unit to obtain the variable, vehicle-specific data value.

8. The closing and opening system according to claim 6, wherein the situation-specific anti-pinch protection parameters are empirically ascertained for a model of the vehicle and any possible operating situation, and wherein the control device includes a memory to store the situation-specific anti-pinch protection parameters.

* * * * *